United States Patent
Stjerneby

[19]

[11] Patent Number: 6,024,329
[45] Date of Patent: Feb. 15, 2000

[54] SUPPORT DEVICE FOR A CABLEWAY

[75] Inventor: Sven Stjerneby, Anderstorp, Sweden

[73] Assignee: Defem System AB, Anderstorp, Sweden

[21] Appl. No.: 08/966,839

[22] Filed: Nov. 10, 1997

[51] Int. Cl.[7] .................................. F16L 3/00; F16L 3/22
[52] U.S. Cl. ............................................. 248/73; 248/68.1
[58] Field of Search ............................ 248/58, 68.1, 73, 248/74.4; 403/205, 300, 331, 403

[56] References Cited

U.S. PATENT DOCUMENTS

| | | | |
|---|---|---|---|
| 2,891,750 | 6/1959 | Bergquist | 248/58 |
| 4,372,511 | 2/1983 | Knowles | 248/68.1 |
| 4,697,874 | 10/1987 | Nozick . | |
| 5,142,606 | 8/1992 | Carney et al. . | |
| 5,359,143 | 10/1994 | Simon | 174/101 |
| 5,384,937 | 1/1995 | Simon | 24/295 |
| 5,435,507 | 7/1995 | Murphy | 248/74.4 |
| 5,448,015 | 9/1995 | Jamet et al. | 174/68.3 |
| 5,689,606 | 11/1997 | Hassan | 385/135 |

FOREIGN PATENT DOCUMENTS 37 42 448  6/1989  Germany .

Primary Examiner—Derek J. Berger
Assistant Examiner—David Heisey
Attorney, Agent, or Firm—Baker & Daniels

[57] ABSTRACT

A support device for a cableway of the kind which comprises a number of longitudinally extending thread elements positioned at a distance from each other and transversely extending thread elements connecting the longitudinally extending thread elements is connectable with the cableway for forming a support surface for cables attached to the cableway and branched off downwardly therefrom, the support device having the object of defining the radius of curvature of the branched off cables.

26 Claims, 4 Drawing Sheets

Fig.3.
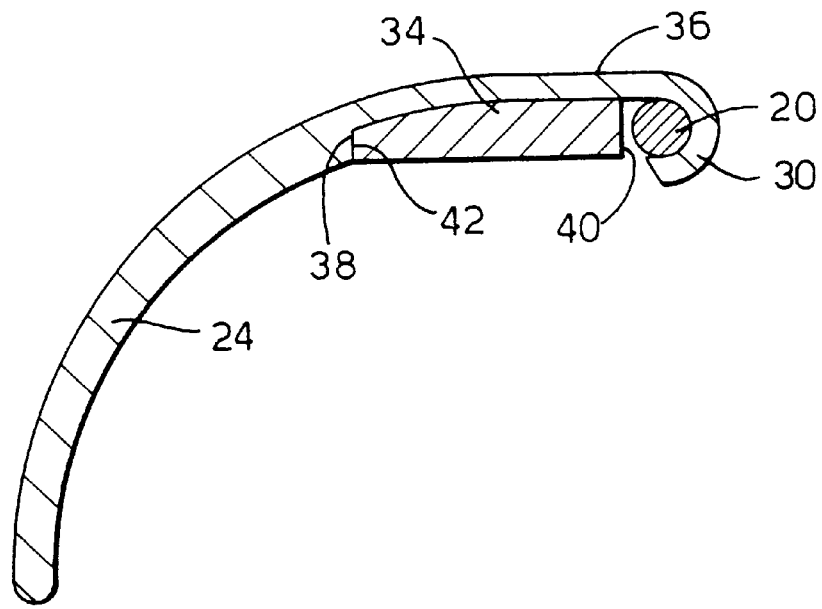
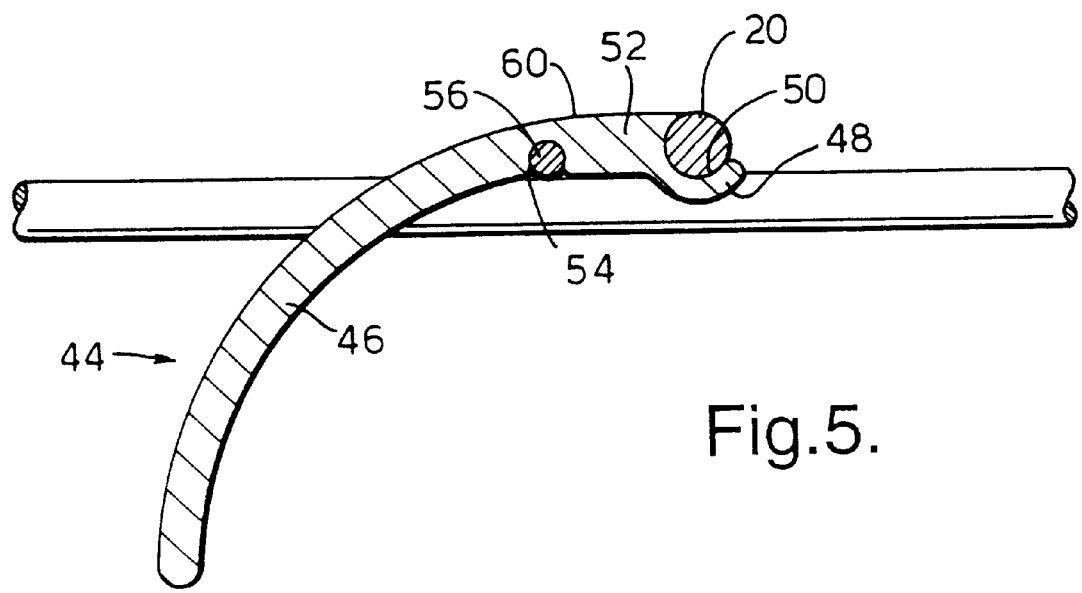
Fig.5.

SUPPORT DEVICE FOR A CABLEWAY

The present invention relates to a support device for a cableway of the kind comprising longitudinally extending thread elements positioned at a distance from each other and transversely extending thread elements connecting the longitudinally extending thread elements.

The use of computer systems and other systems requiring cable connections to and between a large number of different work places has made it necessary to find rational ways for the laying of cables. For this purpose there has been developed so called cable ways, i.e. elongated ladder-like devices consisting of longitudinal and transverse elements. The cableways are fastened to wall surfaces, sealing surfaces and/or other support surfaces by means of different types of attachments and can support a large number of cables which are layed on and are by means of tying or in any other suitable way fixed to the cableways. The cableways can consist of a number of longitudinally extending thread elements positioned at a distance from each other and transversely extending thread elements connecting the longitudinally extending thread elements.

When branching off one or several cables from a cableway it is in certain cases desirable and even necessary that the cables leave the cableway with a radius of curvature which is not less than a certain value. This is important especially with regard to cables including optical fibres as the function of the optical fibres can be jeopardized if the cable comprising the optical fibres is bent to much.

The object of the invention is to provide a support device for a cableway of the kind in question providing that the cables branched off downwardly from the cableway are not subjected to an excessive bending.

In order to comply with this object the support device according to the invention is characterized in that it is connectable with the cableway for forming a support surface for the cables attached to the cableway and branched off downwardly therefrom in order to define the radius of curvature of the cables branched off from the cableway.

Preferably, the support surfaces are thereby provided by a support element in the form of a curved plate which is at an upper portion connectable with the transversely extending and/or longitudinally extending thread elements of the cableway.

In a suitable embodiment of the support device according to the invention the support element is at the upper portion which is connectable with the cableway formed with slots so as to make it possible to displace the support element from a position below the cableway through the bottom of the cableway to a position in which said upper portion of the support element receives the longitudinally extending thread elements of the cableway in its said slots.

Preferably the upper portion of the support element is formed with groove extending perpendicular to the slots and adapted to receive a transversely extending thread element of the cableway when the support element takes the position in which the longitudinally extending thread elements of the cableway are received in the slots. Thereby, the groove can be used for connecting the support element to the cableway. In this case the groove can be undercut and the part of the support element forming the groove can consist of a resilient material so that the support element can be forced to the position in which the groove receives the transversely extending thread element of the cableway.

It is also possible to arrange the groove in such a way that the support element forms a hook-shaped portion, so that the groove can be arranged in the position in which the groove receives the transversely extending thread element by being hooked onto this element.

The support element can be fixed to the cableway by means of a fixing element which is slidable into a space established between the upper surface of the bottom of the cableway and the lower surface of the upper portion of the support element positioned above the longitudinally extending thread elements of the cableway. When using this kind of fixing elements it is not necessary to use the groove of the support element for attaching the support element to the cableway. Thereby the groove is used only for receiving a transversely extending thread element of the cableway so that the upper portion of the support element can be positioned above the upper surface of the cableway. The fixing element makes it possible to attach the support element to the cableway also between the transversely extending thread elements in which case no transversely extending thread element is received in the groove of the support element.

The invention shall be described in the following with reference to the accompanying drawings.

FIG. 3 is a section of the support device according to FIG. 2.

FIG. 5 is a section corresponding to FIG. 3 of a second embodiment of a support device according to the invention.

Figure 1:
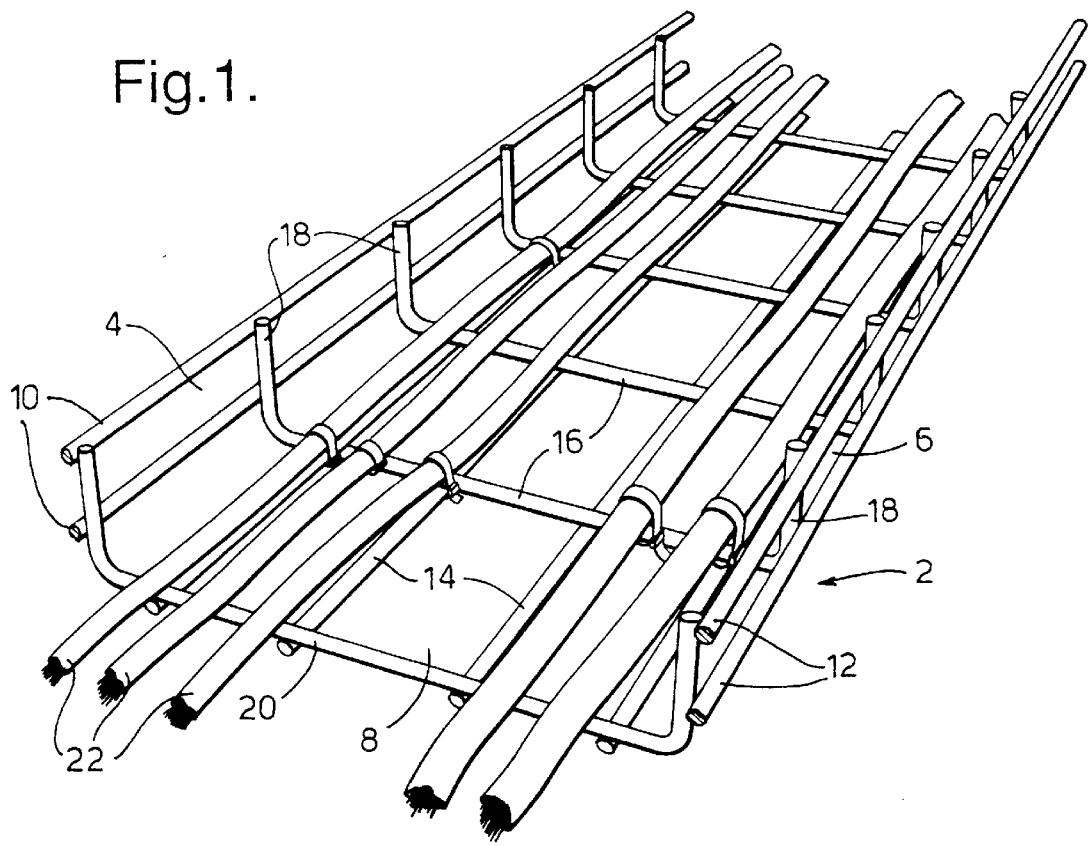
FIG. 1 is a perspective view of a cableway supporting cables and being of the kind at which a support device according to the invention is intended to be used.

The cableway shown in FIG. 1 to which a support device according to the invention shall connected is of substantially U-shaped cross section. The cableway 2 has two side walls 4 and 6 and a bottom 8 consisting of longitudinally extending threads 10, 12 and 14 respectively. The longitudinally extending threads 10, 12 and 14 are connected with each other by means of transversely extending, U-shaped threads 16, the legs 18 of which are connected with the longitudinally extending threads 10 and 12 of the side walls 4 and 6, respectively, and the web portion 12 of which is connected with the longitudinally extending threads 14 of the bottom 8.

The cableway supports a number of cables 22 which by means of tying or in any other way are attached to the cableway.

If one or several of the cables 22 shall be branched off downwardly from the cableway there is attached a support element 24 according to the invention to the cableway. A support element 24 consists of a curved plate 26 which is curved to the radius of curvature which the cable or cables 22 shall have when leaving the cableway. At an upper portion 28 the plate 26 has a bent edge portion 30 formed so that it can be hooked over the web portion 20 of one of the transversely extending threads 16 of the cableway. Thereby the longitudinally extending threads 14 forming the bottom 8 of the cableway are received in slots 32 in the plate 26. Thus, the plate 26 has a number of slots 32 corresponding the number of longitudinally extending threads of the bottom 8 of the cableway, the slots 32 being positioned at a distance from each other adapted to the distance between the longitudinally extending threads 14 of the cableway.

The support element 24 according to the invention is fixed to the cableway by means of a fixing element 34 formed as a support rule which is pushed into the space between the upper surface of the bottom 8 of the cableway, and the opposite lower surface of the upper portion 36 of the plate 26 positioned at the edge 28 of the plate and in which the slots 32 are provided. The fixing element 34 is fixed in the longitudinal direction of the cableway by the fact that the edge portions 38 and 40 of the fixing element engages a support edge 48 at the lower surface of the plate 26 and the opposite side surface of the web portion 20 of a transversely extending thread 16 of the cableway.

Figure 4A:
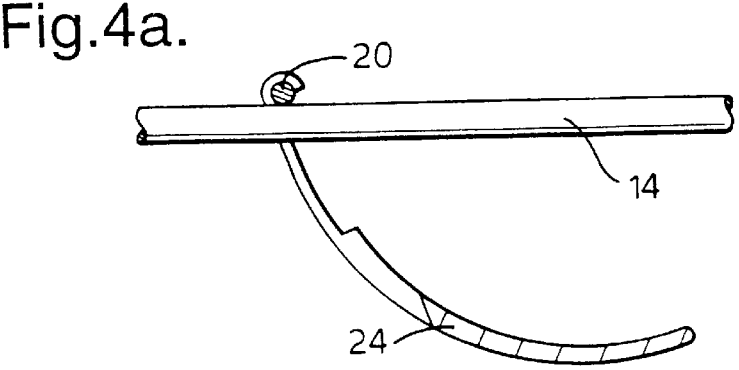
FIGS. 4a, 4b and 4c schematically illustrate the connection of a support device according to FIG. 2 and 3 to a cableway.
Figure 4B:
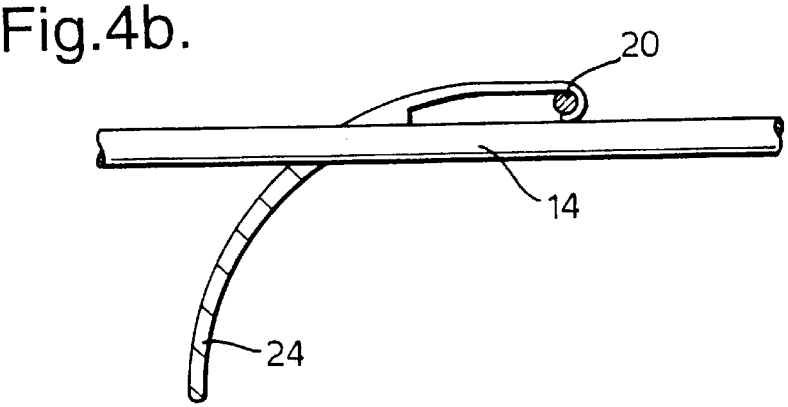
Figure 4C:
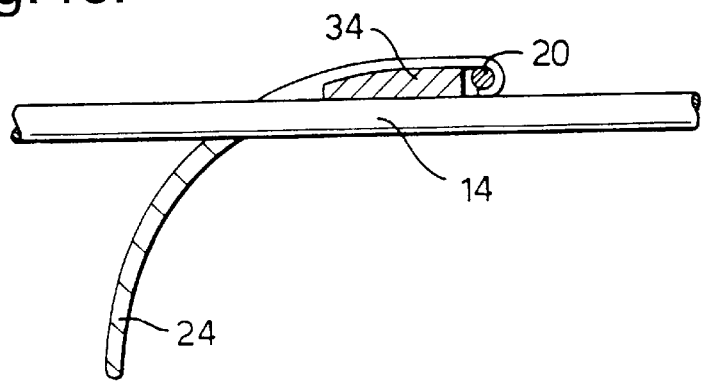

FIGS. 4a, 4b and 4c illustrate the mounting of a support element according to the invention to a cableway. The support element 24 is mounted from the lower side of the cableway which means that the mounting can take place while the cables are supported on the cableway. In the first mounting step the support element 24 is hooked onto the web portion 20 of one of the transversely extending threads 16 by moving the bent edge portion 30 over said web portion 20. In the next step the support element is rotated upwardly to the position shown in FIG. 4b in which the inner ends of the slots 32 engage one thread each of the longitudinally extending threads 14 forming the bottom 8 of the cableway. The fixing element 34 is thereupon pushed from the side of the cableway to the position according to FIG. 4c in which the fixing element 34 engages the cableway and the support element 24 as described above.

The embodiment of the device according to the invention shown in FIG. 5 is adapted to be used in such cases when the space below the cableway is restricted. Such a restricted space can make it impossible to conduct the rotation of the support element 24 necessary when mounting the support element in accordance with FIGS. 4a, 4b and 4c. Like the support element 24 of the embodiment described above the support element 44 according to FIG. 5 consists of a curved plate 46 curved to the radius of curvature which the cable or cables 22 shall have when leaving the cableway. At one edge 48 of the upper portion the plate 46 has a somewhat undercut groove 50. At least the upper edge portion 52 of the plate 46 is manufactured from a resilient material, for example plastic, in such a way that the edge of the support element 44 can be forced over the web portion 20 of one of the transversely extending threads 16 of the cableway to the position shown in FIG. 5. It is realized that the mounting of the support element 44 does not require a free space below the cableway in addition to the space occupied by the support element 44 in the mounted position thereof.

At its lower surface the edge portion 52 of the support element 44 has an undercut groove 54 for receiving a fixing thread 56 which can from the side of the support element 44 be introduced into the groove 54. The fixing thread 56 can be provided with any kind of handle (not shown) in the form of a loop or the like.

Preferably, the groove 50 at the edge 48 of the support element 54 is positioned so that the upper surface 60 of the upper portion 52 of the support element 44 when the support element 54 is connected with the cableway will be positioned in exactly the same plane as the plane of the upper surface of the bottom of the cableway, said surface being defined by the web portions 20 of the transversely extending threads 16 of the cableway.

Figure 2:
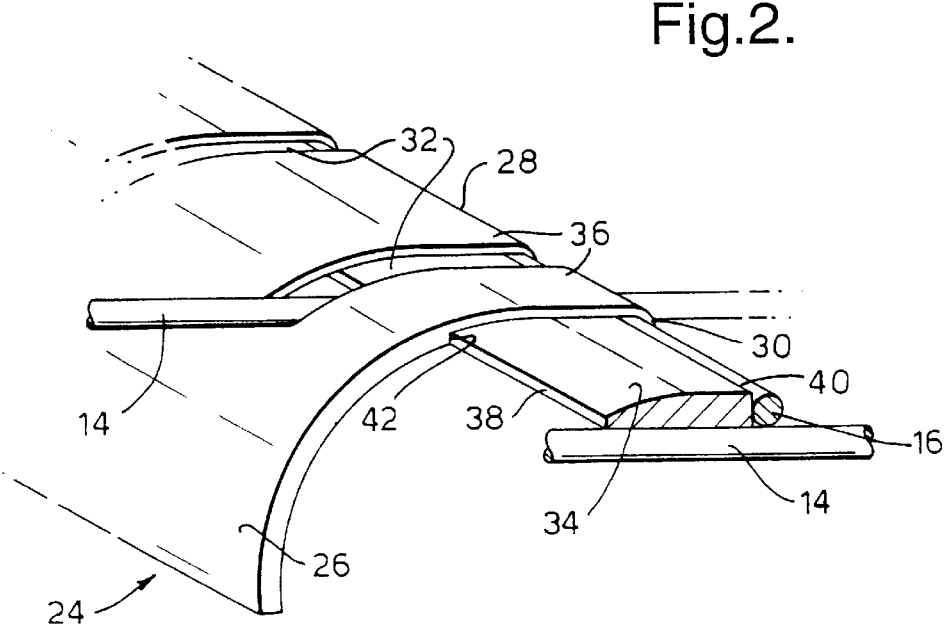
FIG. 2 is a perspective view of a part of an embodiment of a support device according to the invention.

Of course the support element 44 is in the same way as the support element 24 of the embodiment according to FIGS. 2–4 formed with slots receiving the longitudinally extending threads 14 of the cableway.

When downwardly branching off one or more cable of the cable supported on the cableway the cable or cables will rest on the support element thereby providing the cable or cables with the desired radius of curvature which shall usually not be lower than 40 mm.

Figure 6:
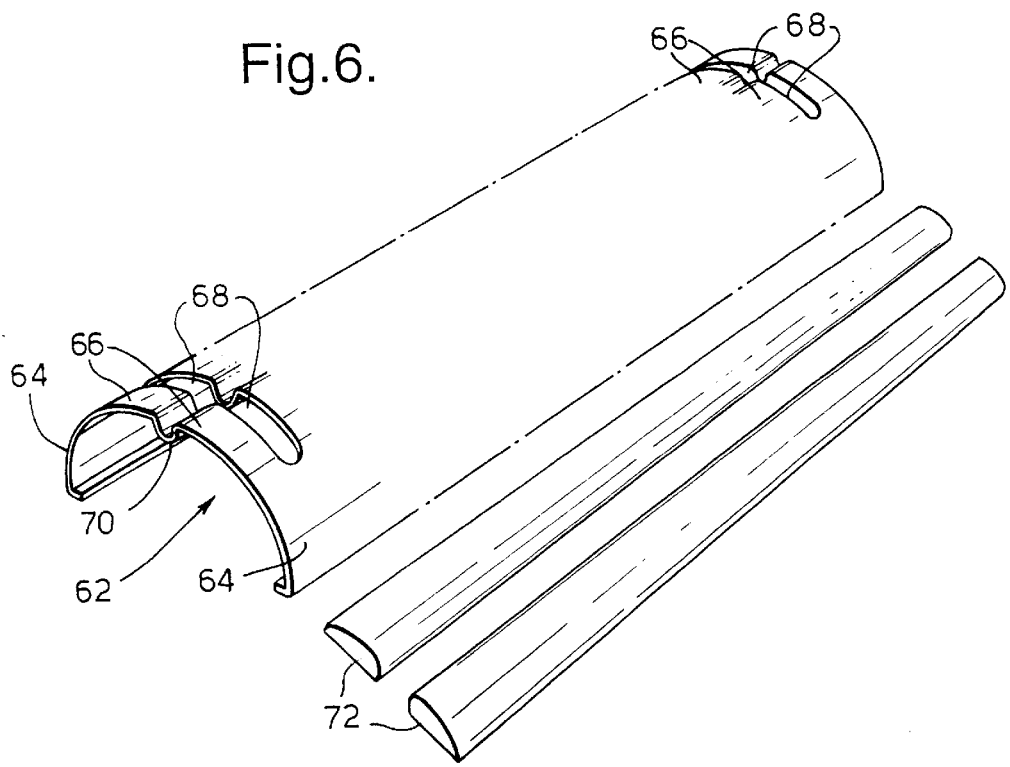
FIG. 6 is a perspective view of a further embodiment of a support device according to the invention.

The embodiment of the support device according to the invention shown in FIG. 6 comprises a curved plate 62 forming two support elements 64 and an upper portion 66. The upper portion 66 is formed with slots 68, the number of slots 68 and the distances between the slots being adapted to the number of longitudinally extending threads of the cableway and the distances between the longitudinally extending threads. The upper portion 66 is also formed with an upwardly open groove 70 extending perpendicular to the slots and adapted to receive a transversely extending thread element of the cableway The embodiment of the support device shown in FIG. 6 also comprises fixing elements 72 in the form of support rules having substantially the same length as the length of the curved plate.

Figure 7:
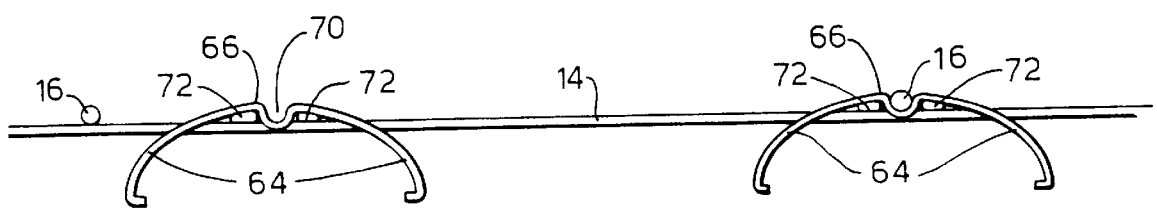
FIG. 7 are a section of two support devices of the kind shown in FIG. 6 connected with a cableway in different positions.

The support device of FIG. 6 can be connected with the cableway as shown in FIG. 7. In FIG. 7 two support devices according to FIG. 6 are connected with the cableway 2 in two different positions in relation to the transversely extending thread element 16 of the cableway 2. The support device shown to the left in FIG. 7 is connected with the cableway between two transversely extending thread elements 16. The support device positioned between the transversely extending thread elements 16 is positioned with the support element 64 having the upper portion 66 positioned above the bottom of the cableway 2 defined by the longitudinally extending thread elements 14 of the cableway. The longitudinally extending thread elements 14 of the cableway are received in the slots 68 in the upper portion 66 of the curved plate 62. The support elements 64 are retained in this position by means of the fixing elements 72 which have been pushed into the spaces defined between the lower surface of the upper portion 66 of the support elements 64 and the upper surfaces of the longitudinally extending thread elements 14 of the cableway 2. In the position shown to the left in FIG. 7 no transversely extending thread element is received in the groove 70.

In the embodiment shown to the right in FIG. 7 the support elements 64 are positioned in the same relationship with the longitudinally extending thread elements 14 as in the position shown to the left in FIG. 7. However, in the position shown to the right in FIG. 7 a transversely extending thread element 16 is received in the groove 70.

It is realized that the support device according to the invention can be modified within the scope of the following claims.

I claim:

1. A support device for a cableway comprising a plurality of longitudinally extending thread elements positioned at a distance from each other and transversely extending thread elements connecting the longitudinally extending thread elements, wherein the support device is connectable with the cableway for forming a support surface for cables attached to the cableway and being branched off downwardly therefrom in order to define the radius of curvature of the branched off cables, the support device comprising a support element constituted by a curved plate which is connectable with the cableway at an upper portion thereof, the upper portion of the support element formed with slots making it possible to displace the support element from the lower side of the cableway up through the bottom of the cableway to a position in which the longitudinally extending thread elements of the cableway are received in the slots of the upper portion of the cableway, whereby said support element is adapted to cause a curve in the cable supported thereon.

2. A support device as claimed in claim 1, characterized in that the upper portion of the support element constitutes a downwardly bent edge portion of the element and is adapted to be hooked over a transversely extending thread element of the cableway when connecting the support element thereto.

3. A support device as claimed in claim 2, characterized by a fixing element introducable into a space defined between a lower surface of the upper portion of the support element and an upper surface of the bottom of the cableway.

4. A support device as claimed in claim 3, characterized in that the fixing element is introducable into said space by being pushed into the space from the side of the cableway.

5. A support device as claimed in claim 3, characterized in that the fixing element is introducable into an undercut groove provided at the lower surface of the upper portion of the support element.

6. A support device as claimed in claim 1, characterized in that the upper portion is formed with a groove extending perpendicular to the slots and adapted to receive a transversely extending thread element of the cableway.

7. A support device as claimed in claim 6, characterized in that the groove is undercut.

8. A support device as claimed in claim 6, characterized by a fixing element introducable into a space defined between a lower surface of the upper portion of the support element and an upper surface of the bottom of the cableway.

9. A support device as claimed in claim 8, characterized in that the fixing element is introducable into said space by being pushed into the space from the side of the cableway.

10. A support device as claimed in claim 8, characterized in that the fixing element is introducable into an undercut groove provided at the lower surface of the upper portion of the support element.

11. A support device as claimed in claim 1, characterized by a fixing element introducable into a space defined between a lower surface of the upper portion of the support element and an upper surface of the bottom of the cableway.

12. A support device as claimed in claim 11, characterized in that the fixing element is introducable into said space by being pushed into the space from the side of the cableway.

13. A support device as claimed in claim 11, characterized in that the fixing element is introducable into an undercut groove provided at the lower surface of the upper portion of the support element.

14. A support device for a cableway comprising a plurality of longitudinally extending thread elements positioned at a distance from each other and transversely extending thread elements connecting the longitudinally extending thread elements, wherein the support device is connectable with the cableway for forming a support surface for cables attached to the cableway and being branched off downwardly therefrom in order to define the radius of curvature of the branched off cables, the support device comprising a support element constituted by a curved plate which is connectable with the cableway at an upper portion thereof, a fixing element introducable into a space defined between a lower surface of the upper portion of the support element and an upper surface of the bottom of the cableway, whereby said support element is adapted to cause a curve in the cable supported thereon.

15. A support device as claimed in claim 14, characterized in that the fixing element is introducable into said space by being pushed into the space from the side of the cableway.

16. A support device as claimed in claim 14, characterized in that the fixing element is introducable into an undercut groove provided at the lower surface of the upper portion of the support element.

17. A support device for a cableway of substantially U-shaped cross-section and having a bottom and two side walls, the cableway comprising a plurality of longitudinally extending thread elements positioned at a distance from each other and transversely extending thread elements connecting the longitudinally extending thread elements, the support device being connectable with the cableway for forming a support surface for cables branched off downwardly from the cableway in order to define the radius of curvature of the branched off cables, wherein the support device is at an upper portion thereof connectable with a transversely extending thread element of the cableway at a desired place of the bottom of the cableway, said upper portion of said support device being connectable to the transversely extending thread element without modification of the cableway, and a fixing element introducable into a space defined between a lower surface of the upper portion of the support device and an upper surface of the bottom of the cableway.

18. A device as claimed in claim 17, wherein the support device is adapted to be releasably connected with the cableway.

19. A support device as claimed in claim 17, wherein the support device is constituted by a curved plate.

20. A support device as claimed in claim 19, wherein the support device is at its upper portion formed with slots making it possible to displace the support device from the lower side of the cableway up through the bottom of the cableway to a position in which the longitudinally extending thread elements of the bottom of the cableway are received in the slots.

21. A support device as claimed in claim 19, wherein the fixing element is introducable into said space by being pushed into the space from the side of the cableway.

22. A support device as claimed in claim 17, wherein the fixing element is introducable into an undercut groove provided at the lower surface of the upper portion of the support device.

23. A support device for a cableway of substantially U-shaped cross-section and having a bottom and two side walls, the cableway comprising a plurality of longitudinally extending thread elements positioned at a distance from each other and transversely extending thread elements connecting the longitudinally extending thread elements, the support device being releasably connectable with the cableway for forming a support surface for cables branched off downwardly from the cableway in order to define the radius of curvature of the branched off cables, wherein the support device is constituted by a curved plate and at an upper portion thereof is adapted to be connectable with a transversely extending thread element of the cableway at a desired place of the bottom of the cableway, said upper portion of said support device adapted to be connectable to the transversely extending thread element without modification of the cableway, the support element is at its upper portion formed with slots making it possible to displace the support device from the lower side of the cableway up through the bottom of the cableway to a position in which the longitudinally extending thread elements of the bottom of the cableway are received in the slots, and wherein the upper portion of the support device constitutes a downwardly bent edge portion which is adapted to be hooked over a transversely extending thread element of the bottom of the cableway when connecting the support device to the cableway.

24. A support device for a cableway of substantially U-shaped cross-section and having a bottom and two side walls, the cableway comprising a plurality of longitudinally extending thread elements positioned at a distance from each other and transversely extending thread elements connecting the longitudinally extending thread elements, the support device being releasably connectable with the cableway for forming a support surface for cables branched off downwardly from the cableway in order to define the radius of curvature of the branched off cables, wherein the support device is constituted by a curved plate and at an upper portion thereof is adapted to be connectable with a transversely extending thread element of the cableway at a desired place of the bottom of the cableway, said upper portion of said support device adapted to be connectable to the transversely extending thread element without modification of the cableway, the support element is at its upper portion formed with slots making it possible to displace the support device from the lower side of the cableway up through the bottom of the cableway to a position in which the longitudinally extending thread elements of the bottom of the cableway are received in the slots, and wherein the upper portion of the support device is formed with a groove extending perpendicular to the slots and adapted to receive a transversely extending thread element of the bottom of the cableway.

25. A support device as claimed in claim 24, wherein the groove is undercut.

26. A support device for a cableway of substantially U-shaped cross-section and having a bottom and two side walls, the cableway comprising a plurality of longitudinally extending thread elements positioned at a distance from each other and transversely extending thread elements connecting the longitudinally extending thread elements, the support device being connectable with the cableway for forming a support surface for cables branched off downwardly from the cableway in order to define the radius of curvature of the branched off cables, wherein the support device is at an upper portion thereof connectable with a transversely extending thread element of the cableway at a desired place of the bottom of the cableway, said upper portion of said support device being connectable to the transversely extending thread element without modification of the cableway, and wherein the support device has support surfaces at both sides of its upper portion.

* * * * *